United States Patent Office 2,920,033
Patented Jan. 5, 1960

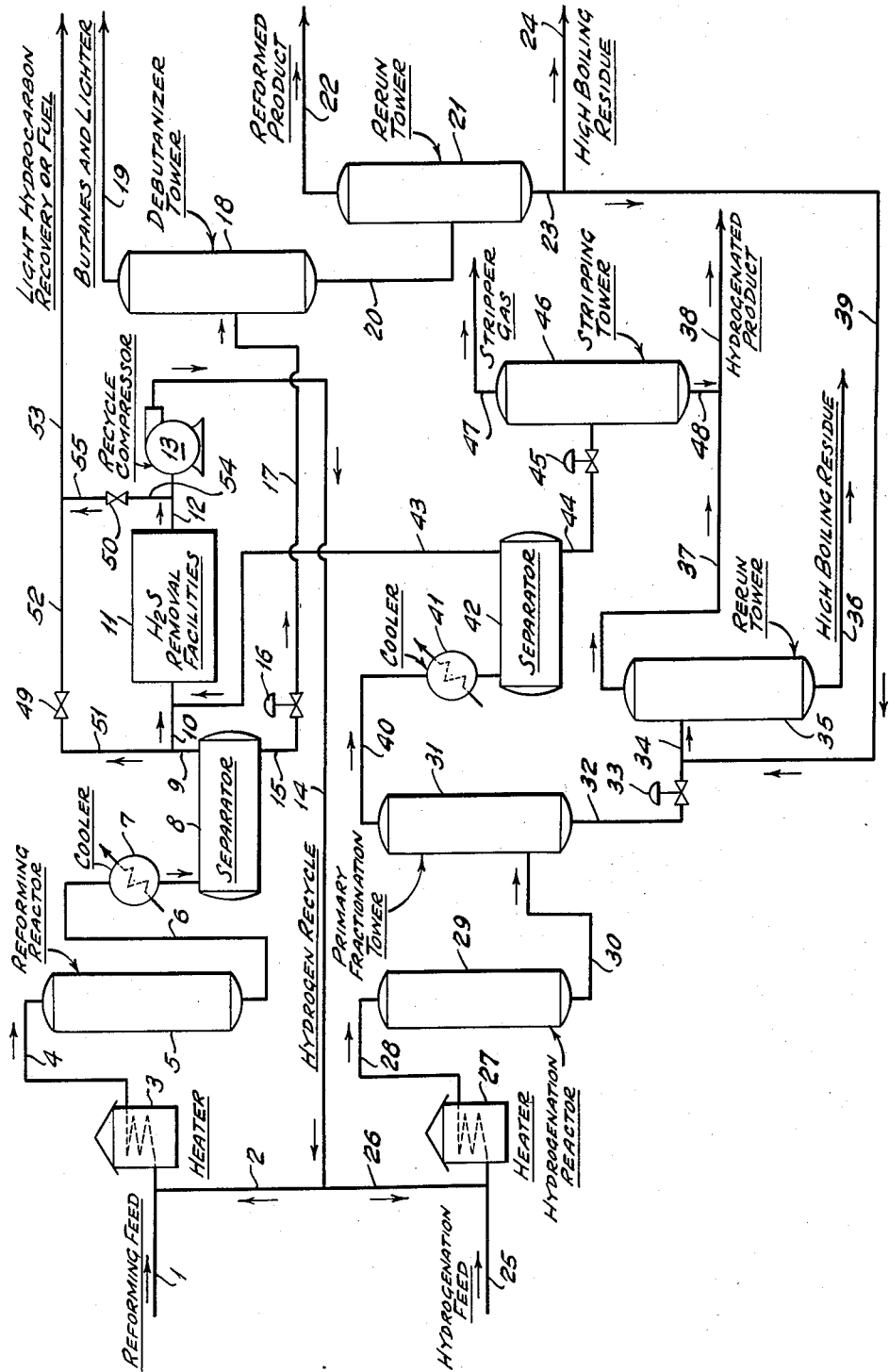

2,920,033

HYDROCARBON CONVERSION PROCESS WITH THE RECYCLING OF AN ENRICHED HYDROGEN STREAM

David K. Beavon, Los Angeles, Calif., assignor to Texaco Inc., New York, N.Y., a corporation of Delaware Application May 2, 1955, Serial No. 505,198

7 Claims. (Cl. 208—134)

This invention relates to a hydrocarbon conversion process. More particularly, it relates to an improved combined catalytic reforming and hydrogenation process. In one specific embodiment, hydrogen produced in reforming a motor fuel fraction is employed to supply the hydrogen required for the mild hydrogenation of the same or another motor fuel fraction.

Catalytic reforming is a term used in the petroleum industry to describe a process for the treatment of motor fuel fractions to improve the anti-knock characteristics of these fractions. The process may be applied to straight run gasolines or hydrocarbon mixtures from catalytic cracking, thermal cracking, polymerization, hydrocarbon synthesis or other similar processes. Either full range gasolines or selected fractions thereof may be advantageously treated by catalytic reforming. A preferred catalyst for catalytic reforming is a supported noble metal such as platinum on alumina although other catalysts such as molybdena-alumina or chromia-alumina have been found useful. Usual operating conditions include temperatures of 600 to 1000° F., pressures of 50 to 1000 p.s.i.g., space velocities of 0.5 to 10 weight of oil per hour per weight of catalyst (w./hr./w.), and hydrogen rates of 0.5 to 10 mols of hydrogen per mol of oil.

Under the conditions described above a number of reactions occur which improve the anti-knock characteristics of the motor fuel fraction. These reactions include the dehydroaromatization of naphthenes to produce aromatics, the isomerization of paraffins to produce more highly branched chain structures, the hydrocracking of paraffins to produce lower molecular weight paraffins and the dehydrocyclization of paraffins to produce aromatics. Of the foregoing, the dehydroaromatization and dehydrocyclization reactions produce hydrogen and the hydrocracking reaction consumes hydrogen. However, since the dehydroaromatization reaction which produces large quantities of hydrogen is predominant and the hydrocracking reaction is suppressed, relatively large quantities of by-product hydrogen are available from catalytic reforming.

Mild hydrogenation of motor fuel stocks may be variously employed to reduce sulfur content, improve storage stability, improve engine cleanliness characteristics, improve color or to improve the odor of the treated stock. Mild hydrogenation is characterized as the reaction of hydrogen with a hydrocarbon fraction or component thereof under conditions such that substantial cracking or the formation of lower boiling components is avoided. The process is commonly carried out at temperatures from 500 to 900° F. and at pressures from atmospheric to 1500 p.s.i.g. Pressures in excess of 50 p.s.i.g. are preferred. Liquid hourly space velocities from 0.5 to 15 volumes of oil per hour per volume of catalyst (v./hr./v.) are employed. A hydrogen containing gas is supplied at a rate of about 200 to 20,000 cubic feet per barrel of oil charged and about 20 to 1000 cubic feet of hydrogen per barrel of oil is consumed. Sulfur-active catalysts are used, for example, molybdena-alumina, chromia-alumina, cobalt-molybdate, molybdenum sulfide, nickel-tungsten-sulfide, or supported noble metal catalysts.

This invention provides an improved integrated reforming and hydrogenation process wherein a naphthene-containing motor fuel fraction is reformed in the presence of a hydrogen-containing gas and a reforming catalyst under conditions wherein at least a portion of the napthenes are converted to aromatics and additional hydrogen. A hydrogen-containing gas is separated, a portion is recycled to the reforming step and a further portion is withdrawn to supply the hydrogen required for a mild hydrogenation step. In the hydrogenation step a sulfur-containing motor fuel fraction and the hydrogen-containing gas are contacted with a sulfur-active hydrogenation catalyst under conditions wherein at least a portion of the hydrogen is reacted wtih a component of said sulfur containing motor fuel fraction. An enriched hydrogen-containing gas containing a greater proportion of hydrogen to hydrocarbons than the hydrogen-containing gas charged to the hydrogenation step is separated from the hydrogenated products. At least a portion of this enriched hydrogen-containing gas is returned to the reforming step to supply at least a portion of the hydrogen-containing gas required therein. Preferred conditions for the catalytic reforming step of the present invention include temperature range of 850 to 950° F., pressures of 450 to 750 p.s.i.g. and space velocities of 0.5 to 3 weight of oil per hour per weight of catalyst. Preferred conditions for the mild hydrogenation step of the present invention include temperatures from 540 to 800° F., pressures of 450 to 750 p.s.i.g., space velocities of 3 to 12 volumes of oil per hour per volume of catalyst and hydrogen recycle rates of about 750 to 1500 cubic feet per barrel of feed.

As described above catalytic reforming is an effective means of improving the anti-knock characteristics of motor fuels and mild hydrogenation is an effective means of controlling sulfur, gum and stability of motor fuels. The characteristics of motor fuel fractions from various sources differ widely so that some stocks may require treatment for anti-knock improvement, other stocks require treatment for sulfur, gum and stability control and some stocks are advantageously processed by both types of treatment. The operating costs and investment have formerly made hydrogenation unattractive economically in comparison with acid treating for the control of sulfur, gum and stability. The present invention, by integrating catalytic reforming and mild hydrogenation takes advantage of the characteristics of each to improve the relative economics of hydrogenation. The present invention enhances the attractiveness of mild hydrogenation as well as catalytic reforming by combining the two processes so that each contributes to the efficient operation of the other.

One advantage of the integrated operation of the present invention is that hydrogen required for mild hydrogenation is supplied by catalytic reforming.

Another advantage of this invention is that the hydrogen-containing gas used in the mild hydrogenation process is enriched and this enriched gas may then be employed to increase the hydrogen content of the recycle gas in the catalytic reforming step. Increased purity of the hydrogen-containing recycle gas in the catalytic reforming step improves this operation by increasing catalyst life and permitting the production of higher anti-knock value products.

A further advantage of this invention is that fractionation equipment may be efficiently integrated so that motor fuel fractions separated from catalytic reformate as undesirable for inclusion in premium grade gasoline may be recovered with the hydrogenated product to the extent that it contains fractions suitable for inclusion in regular grade gasoline.

The accompanying drawing diagrammatically illustrates the process of this invention. Although the drawing illustrates one arrangement of apparatus in which the process of this invention may be practiced, it is not intended to limit the invention to the particular apparatus or material described.

Catalytic reforming feed stock is withdrawn from external storage, not shown, and is admitted to feed inlet line 1. Recycle gas, rich in hydrogen, from lines 14 and 2 is combined with the catalytic reforming feed and charged to heater 3. The preheated hydrogen and reforming feed pass through transfer line 4 into reactor 5 which contains a reforming catalyst. The reactor effluent passes through transfer line 6, cooler 7 and is discharged into separator 8 where gas and liquid are separated. Gas from separator 8, which is rich in hydrogen, is removed and transported through lines 9 and 10 to hydrogen sulfide removal facilities 11. Various means may be employed for the removal of hydrogen sulfide, for example, scrubbing with diethanolamine solution.

Purified gas is drawn from hydrogen sulfide removal facilities through line 12 to recycle compressor 13 which discharges the gas into recycle gas line 14. Liquid from separator 8 is withdrawn through line 15 and control valve 16. Separator liquid is directed through line 17 to debutanizer tower 18. Debutanizer 18 is a fractional distillation means wherein hydrocarbons lower boiling than the desired catalytically reformed product are separated. These lower boiling hydrocarbons, indicated as butanes and lighter in the figure, are discharged through line 19 to other facilities, not shown, for the separation and utilization of the components of this stream. The debutanized liquid is discharged from debutanizer tower 18 through line 20 to rerun tower 21. Rerun tower 21 is a fractional distillation means wherein the catalytic reformate is redistilled to the desired distillation end-point. In rerun tower 21, the desired catalytically reformed product is separated as an overhead fraction and a high boiling residue as bottoms. The desired catalytically reformed product is discharged through line 22 to external tankage not shown. High boiling residue is removed from rerun tower 21 through line 23 and may be discharged to external tankage, not shown, through line 24, or it may be further processed as described later.

Feed stock for the hydrogenation process is withdrawn from external tankage, not shown, and is charged through line 25. Recycle gas, rich in hydrogen, from line 14 is passed through line 26, combined with the hydrogenation feed in line 25 and passed through heater 27. The heater effluent is discharged through transfer line 28 to hydrogenation reactor 29 which contains a hydrogenation catalyst. Effluent from hydrogenation reactor 29 is transferred through line 30 to primary fractional distillation tower 31 where a preliminary separation is made between a fraction containing undesirable high boiling components and a fraction containing the desired hydrogenated product. Primary fractional distillation tower 31 effects a separation of high boiling components in the presence of the hydrogen contained in the reactor effluent and at a pressure substantially that prevailing in the aforesaid reaction zone. This separation is effected by employing the sensible heat of the hydrogenated product to supply the heat required for distillation. The high boiling residue fraction is withdrawn from tower 31 through line 32, control valve 33 and is discharged through line 34 into rerun tower 35. Rerun tower 35 is a fractional distillation means which is employed to separate a relatively small fraction boiling within the boiling range of the desired hydrogenation product from the high boiling residue. The high boiling residue is withdrawn from rerun tower 35 and is discharged through line 36 to external storage, not shown. Distillate from rerun tower 35, which is the fraction boiling within the boiling range of the desired hydrogenated product, is removed through lines 37 and 38 and discharged to external product storage, not shown.

When the desired catalytically reformed product has a distillation end-point lower than that of the desired hydrogenated product, rerun tower 35 may be employed advantageously to recover a fraction intermediate between the two boiling ranges from the catalytic reforming residue. In this case, high boiling residue is not removed through line 24 but in the alternative is transferred through lines 23 and 39 to line 34 where it is mixed with the high boiling residue fraction from the hydrogenation process and the combined residue stream is directed to rerun tower 35.

Returning to primary fractional distillation tower 31, the overhead fraction is removed through line 40 and cooler 41 and discharged into gas-liquid separator 42. Gas from separator 42, which is rich in hydrogen, is withdrawn through line 43 and combined with the gas in line 10 to effect recycle of the hydrogen-containing gas stream. Liquid from separator 42 is discharged through line 44 and control valve 45, and is directed to stripping tower 46. Stripping tower 46 is a fractional distillation means wherein hydrocarbons lower boiling than the desired hydrogenated product are separated from the hydrogenated product of the desired boiling range. Low boiling hydrocarbons from srtipping tower 46 are discharged through line 47 to other facilities, not shown, for the separation and utilization of the components of this stream. Hydrogenated product of the desired boiling range is removed from stripping tower 46 through line 48, combined with the rerun product in line 37, and discharged through line 38 to external product storage, not shown.

When the reforming and hydrogenation processes are operated under conditions such that the hydrogen consumed in the hydrogenation step equals that produced in the reforming operation, valves 49 and 50 would be closed. However, when the hydrogen consumed is less than that produced, valve 50 is closed valve 49 opened and excess hydrogen-containing gas is withdrawn from separator 8 through lines 9 and 51, valve 49, and lines 52 and 53 to light hydrocarbon recovery facilities or fuel use, not shown. Should it be desired to remove hydrogen sulfide from the excess hydrogen-containing gas before discharging the gas from the process it may be advantageous, in the alternative, to close valve 49, open valve 50 and remove the purified gas from line 12 through line 54, valve 50 and lines 55 and 53.

The invention will be further illustrated by the following examples.

EXAMPLE I

A straight run naphtha is reformed and a mixture of heavy catalytically cracked and heavy thermally cracked naphthas are hydrogenated in an integrated catalytic reforming and mild hydrogenation process as described above with the following results:

*Catalytic reforming*

| | |
|---|---|
| Feed stock | Straight run naphtha. |
| Gravity, °API | 51.9. |
| Lamp sulfur, wt. percent | 0.04. |
| Aniline point, °F. | 127.8. |
| ASTM Research Octane No.: | |
| Clear | 55.7. |
| +3 cc. Tel/gal. | 75.3. |
| ASTM distillation: | |
| IBP | 196. |
| EP | 401. |
| Reid vapor pressure, lbs. | 1.2. |
| Product | Catalytic reformate. |
| Gravity, °API | 46.0. |

ASTM Research Octane
No.:
  Clear _____ 90.0.
  +3.0 cc. Tel. _____ 98.0.
Reid vapor pressure, lbs. __ 1.7.
Operating conditions:
  Reactor inlet temperature,
    ° F. _____ 950.
  Pressure, p.s.i.g. _____ 500.
  Space velocity, w./hr./w. __ 4.5.
  Catalyst _____ Platinum supported on alumina.
  Recycle gas purity, mol ratio H₂ to hydrocarbon___ 11.5.
  Reactor effluent separator gas, mol ratio H₂ to hydrocarbon _____ 11.2.
  Hydrogen rate, cu. ft./bbl. _____ 5700.

*Mild hydrogenation*

Feed stock _____ Mixed heavy thermally and catalytically cracked naphthas.
  Gravity, ° API _____ 42.6.
  Lamp sulfur, wt. percent__ 0.583.
  General Motors Sludge No. _____ 170.
  Gum, ASTM, mg. _____ 32.
Product _____ Hydrogenated product.
  Gravity, ° API _____ 44.4.
  Lamp sulfur, wt. percent__ 0.388.
  General Motors Sludge No.[1] _____ 24.
  Gum, ASTM, mg. _____ 4.
Operating conditions:
  Average reactor temperature, ° F. _____ 657.
  Pressure, p.s.i.g. _____ 512.
  Space velocity, v./hr./v. __ 3.0.
  Catalyst _____ Molybdena alumina.
  Recycle gas purity, mol ratio H₂ to hydrocarbon _____ 11.5.
  Primary fractionator separator gas, mol ratio H₂ to hydrocarbon _____ 15.8.
  Hydrogen rate, cu. ft./bbl_ 890.

[1] Described in report "Trends in Motor Fuels" by H. R. Wolf, presented September 18, 1947, at the 45th Annual Meeting of the National Petroleum Association held at Atlantic City, N.J.

The molybdena-alumina catalyst used in the mild hydrogenation step of this example had been previously used for catalytic reforming. When freshly prepared, this catalyst had a surface area of about 135 square meters per gram,[1] but had been used for catalytic reforming until the surface area was reduced to 55 square meters per gram. This catalyst had become substantially deactivated for catalytic reforming but it will be noted from the example that it is entirely satisfactory for use as a mild hydrogenation catalyst.

In the example above, the feed stocks for the catalytic reforming and mild hydrogenation sections were obtained from different sources. It may also be advantageous to process stocks from the same source in the two sections or to process a stock first in the mild hydrogenation section and then further process the hydrogenated product in the catalytic reforming section.

Obviously many modifications and variations of the invention as hereinbefore set forth may be made without departing from the spirit and scope thereof and only such limitations should be imposed as are indicated in the appended claims.

[1] Determined by nitrogen adsorption using the method reported by Bruanuer, S., Emmett, P. H., and Teller, E., J. Am. Chem. Soc. 60, 309–19 (1938).

I claim:
1. In a process for the reforming of a motor fuel fraction which process comprises contacting a motor fuel fraction with a reforming catalyst under reforming conditions with the concomitant production of hydrogen, separating a hydrogen containing gas from the reformed product and returning a portion of the separated hydrogen containing gas to the reforming zone, the steps which comprise separately contacting a liquid hydrocarbon fraction in a hydrogenation zone under conditions of mild hydrogenation with a hydrogenation catalyst in the presence of a portion of said separated hydrogen containing gas, said mild hydrogenation being characterized by the consumption of hydrogen, recovering from the effluent from said hydrogenation zone an improved liquid hydrocarbon product and an enriched hydrogen containing gas having a hydrogen to hydrocarbon mol ratio substantially higher than the hydrogen to hydrocarbon mol ratio of said separated hydrogen containing gas and introducing at least a portion of said enriched hydrogen containing gas into the catalytic reforming zone.

2. In a process for the reforming of a motor fuel fraction which process comprises contacting a motor fuel fraction with a reforming catalyst under reforming conditions with the concomitant production of hydrogen, separating hydrogen containing gas from the reformed product and returning a portion of the separated hydrogen containing gas to the reforming zone, the steps which comprise separately contacting a sulfur containing liquid hydrocarbon fraction in a desulfurization zone under desulfurization conditions with a sulfur resistant hydrogenation catalyst in the presence of a portion of said separated hydrogen containing gas, said desulfurization step being characterized by the consumption of hydrogen, recovering from the effluent from said desulfurization zone an improved liquid hydrocarbon product of reduced sulfur content and an enriched hydrogen containing gas having a hydrogen to hydrocarbon mol ratio substantially higher than the hydrogen to hydrocarbon mol ratio of said separated hydrogen containing gas and introducing at least a portion of said enriched hydrogen containing gas into the catalytic reforming zone.

3. In a process for the reforming of a motor fuel fraction which process comprises contacting a motor fuel fraction with a reforming catalyst under reforming conditions with the concomitant production of hydrogen, separating a hydrogen containing gas from the reformed product and returning a portion of the separated hydrogen containing gas to the reforming zone, the steps which comprise separately contacting a sulfur containing liquid hydrocarbon fraction in a desulfurization zone with sulfur resistant hydrogenation catalyst at a temperature between about 500° F. and 900° F., a pressure in excess of 50 p..s.i.g. and a space velocity of 0.5–15 volumes of liquid feed per hour per volume of catalyst in the presence of a portion of said separated hydrogen containing gas, recovering from the effluent from said desulfurization zone an improved liquid hydrocarbon product of reduced sulfur content and an enriched hydrogen containing gas having a hydrogen to hydrocarbon mol ratio substantially higher than the hydrogen to hydrocarbon mol ratio of said separated hydrogen containing gas and introducing at least a portion of said enriched hydrogen containing gas into the catalytic reforming zone.

4. The process of claim 3 in which the desulfurization is conducted at a temperature between 540 and 800° F., a pressure between 450 and 750 p.s.i.g. and a space velocity between 3.0 and 12.0 volumes of liquid feed per hour per volume of catalyst.

5. The process of claim 3 in which the pressure of the desulfurization step is substantially the same as that of the catalytic reforming step.

6. The process of claim 3 in which the hydrogen to hydrocarbon mol ratio of the separated hydrogen containing gas is about 11 and the hydrogen to hydrocarbon mol ratio of the enriched hydrogen containing gas is about 16.

7. A combination process for the production of a motor fuel of high octane number which comprises contacting a motor fuel fraction with a hydrogenation catalyst in a hydrogenation zone under conditions of mild hydrogenation in the presence of a hydrogen containing gas, said mild hydrogenation being characterized by the consumption of hydrogen, separating from the hydrogenation zone effluent a motor fuel fraction and an enriched hydrogen containing gas having a substantially higher hydrogen to hydrocarbon mol ratio than the hydrogen containing gas introduced into the hydrogenation zone with the motor fuel feed, passing the separated motor fuel fraction into a catalytic reforming zone, contacting said separated motor fuel fraction in said reforming zone with a reforming catalyst in the presence of hydrogen under reforming conditions with the concomitant production of hydrogen, separating the effluent from the reforming zone into a recycle hydrogen containing gas stream and a motor fuel of improved octane number, returning a portion of the recycle hydrogen containing gas stream to the hydrogenation zone, returning a separate portion of the recycle hydrogen containing gas stream to the reforming zone and combining with said portion returned to the reforming zone at least a portion of the enriched hydrogen containing gas separated from the hydrogenation zone effluent, thereby increasing the hydrogen to hydrocarbon mol ratio of the recycle hydrogen containing gas stream being returned to the reforming zone.

References Cited in the file of this patent
UNITED STATES PATENTS

| | | |
|---|---|---|
| 2,642,381 | Dickinson | June 16, 1953 |
| 2,730,556 | Liedholm | Jan. 10, 1956 |
| 2,772,215 | Hemminger | Nov. 27, 1956 |
| 2,772,216 | Elliot | Nov. 27, 1956 |
| 2,773,007 | Gerhold | Dec. 4, 1956 |